(12) United States Patent
Uttarwar et al.

(10) Patent No.: US 12,182,441 B2
(45) Date of Patent: Dec. 31, 2024

(54) ALLOCATION OF HOST MEMORY BUFFER FOR SUSTAINED SEQUENTIAL WRITES

(71) Applicant: Western Digital Technologies, Inc., San Jose, CA (US)

(72) Inventors: Sagar Uttarwar, Karnataka (IN); Disha Gundecha, Maharashtra (IN)

(73) Assignee: SANDISK TECHNOLOGIES, INC., Milpitas, CA (US)

(*) Notice: Subject to any disclaimer, the term of this patent is extended or adjusted under 35 U.S.C. 154(b) by 77 days.

(21) Appl. No.: 17/737,830

(22) Filed: May 5, 2022

(65) Prior Publication Data
US 2023/0359391 A1   Nov. 9, 2023

(51) Int. Cl.
*G06F 3/06* (2006.01)
*G06F 12/0882* (2016.01)

(52) U.S. Cl.
CPC .......... *G06F 3/0656* (2013.01); *G06F 3/0604* (2013.01); *G06F 3/0679* (2013.01); *G06F 12/0882* (2013.01)

(58) Field of Classification Search
CPC .... G06F 3/0656; G06F 3/0604; G06F 3/0679; G06F 12/0882; G06F 3/061; G06F 12/0246; G06F 2212/7203
USPC ....................................................... 711/154
See application file for complete search history.

(56) References Cited

U.S. PATENT DOCUMENTS

| | | |
|---|---|---|
| 10,567,006 B2 | 2/2020 | Hahn et al. |
| 10,635,580 B2 | 4/2020 | Bordia et al. |
| 10,831,379 B2 | 11/2020 | Hodes et al. |
| 11,188,250 B2 | 11/2021 | Springberg et al. |
| 11,205,473 B2 | 12/2021 | Inbar et al. |
| 11,211,119 B1 | 12/2021 | Gorobets et al. |
| 2020/0310677 A1* | 10/2020 | Byun ................... G06F 3/0656 |
| 2021/0110866 A1* | 4/2021 | Gopalakrishnan .......................... G06F 12/0246 |
| 2022/0179581 A1* | 6/2022 | Byun ................... G06F 3/0619 |
| 2022/0222011 A1* | 7/2022 | Choi .................... G06F 3/0659 |

* cited by examiner

*Primary Examiner* — Hua J Song
(74) *Attorney, Agent, or Firm* — ARENTFOX SCHIFF LLP

(57) ABSTRACT

Aspects of a storage device for providing superior sustained sequential write (SSW) performance are disclosed. A controller on the storage device allocates buffer space in the host memory buffers (HMBs) on the host device for storage of relocation data, i.e., data to be folded or compacted. The controller or a hardware element therein can therefore allocate local SRAM (including TRAM) for use in accommodating incoming host writes. The increased SRAM allocation of relocation data without an attendant increase in cost or size to the storage device enables the storage device to perform operations in parallel and substantially increase SSW performance metrics.

17 Claims, 14 Drawing Sheets

| tProg (uSec) | Example NVM Storage Device 402 |||
|---|---|---|---|
| | SLC 404 | TLC 406 | QLC 408 |
| | 90-100 | 1600-1700 | Foggy 2600-2700 |
| | | | Fine 4200-4300 |

FIG. 4

ALLOCATION OF HOST MEMORY BUFFER FOR SUSTAINED SEQUENTIAL WRITES

BACKGROUND

Field

This disclosure is generally related to electronic devices and more particularly to storage devices.

INTRODUCTION

Storage devices enable users to store and retrieve data. Examples of storage devices include non-volatile memory devices. A non-volatile memory generally retains data after a power cycle. An example of a non-volatile memory is a flash memory, which may include array(s) of NAND cells on one or more dies. Flash memory may be found in solid-state devices (SSDs), Secure Digital (SD) cards, and the like.

Storage devices may receive a sequence of sustained writes from a host device. To maintain pace with the write sequence and store the data timely, the storage device may include cache memory such as random access memory (SRAM). Because SRAM is a fast memory, it can generally assist in tasks like host data accumulation. SRAM is expensive, however, and is consequently often limited in capacity. When SRAM reaches operational capacity during a sustained write sequence, the storage device is often unable to keep pace. The problem is exacerbated in cases where tasks like folding or compaction are required for a robust and speedy storage device.

SUMMARY

One aspect of a data storage apparatus is disclosed herein. The storage apparatus includes a non-volatile memory and a controller. The non-volatile memory includes a memory location. The controller is coupled to the non-volatile memory. The controller may be configured to receive an input/output (I/O) instruction from a host device. The controller may also be configured to allocate one or more host memory buffers (HMBs) on the host device for storing relocation data. The controller may further be configured to store the relocation data in the one or more HMBs. The controller may also be configured to write the relocation data to the memory location using data in the one or more HMBs.

Another aspect of a data storage device is disclosed herein. The storage device includes a local cache memory and nonvolatile memory including a plurality of storage locations. The storage device also includes a controller. The controller is coupled to the non-volatile memory and configured to receive successive write instructions from a host device. The controller is further configured to allocate host memory buffers (HMBs) on the host device for relocation data. The controller is also configured to retrieve the relocation data for storing in the HMBs. The controller is further configured to write the relocation data from the HMBs while processing remaining ones of the successive write instructions.

A further aspect of a data storage device is disclosed herein. The storage device includes a local cache memory and a non-volatile memory including a plurality of memory locations. The storage device also includes a controller coupled to the non-volatile memory and the cache memory. The controller is configured to execute write operations to store data in the memory locations responsive to a receiving a plurality of sequential write operations received from a host device. The controller is also configured to allocate, during execution of the write operations, relocation data used for folding or compaction in a first capacity to the local cache memory and in a second capacity to host memory buffers on the host device.

It is understood that other aspects of the storage device will become readily apparent to those skilled in the art from the following detailed description, wherein various aspects of apparatuses and methods are shown and described by way of illustration. As will be realized, these aspects may be implemented in other and different forms and its several details are capable of modification in various other respects. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein:

FIG. 4 is a table illustrating an example programming time of different versions of a storage device.

DETAILED DESCRIPTION

The detailed description set forth below in connection with the appended drawings is intended as a description of various exemplary embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

The words "exemplary" and "example" are used herein to mean serving as an example, instance, or illustration. Any exemplary embodiment described herein as "exemplary" is not necessarily to be construed as preferred or advantageous over other exemplary embodiments. Likewise, the term "exemplary embodiment" of an apparatus, method or article of manufacture does not require that all exemplary embodiments of the invention include the described components, structure, features, functionality, processes, advantages, benefits, or modes of operation.

As used herein, the term "coupled" is used to indicate either a direct connection between two components or, where appropriate, an indirect connection to one another through intervening or intermediate components. In contrast, when a component referred to as being "directly coupled" to another component, there are no intervening elements present.

In the following detailed description, various aspects of a storage device in communication with a host device will be presented. These aspects are well suited for flash storage devices, such as SSDs and SD cards. However, those skilled in the art will realize that these aspects may be extended to all types of storage devices capable of storing data. Accordingly, any reference to a specific apparatus or method is intended only to illustrate the various aspects of the present invention, with the understanding that such aspects may have a wide range of applications without departing from the spirit and scope of the present disclosure.

Figure 1:
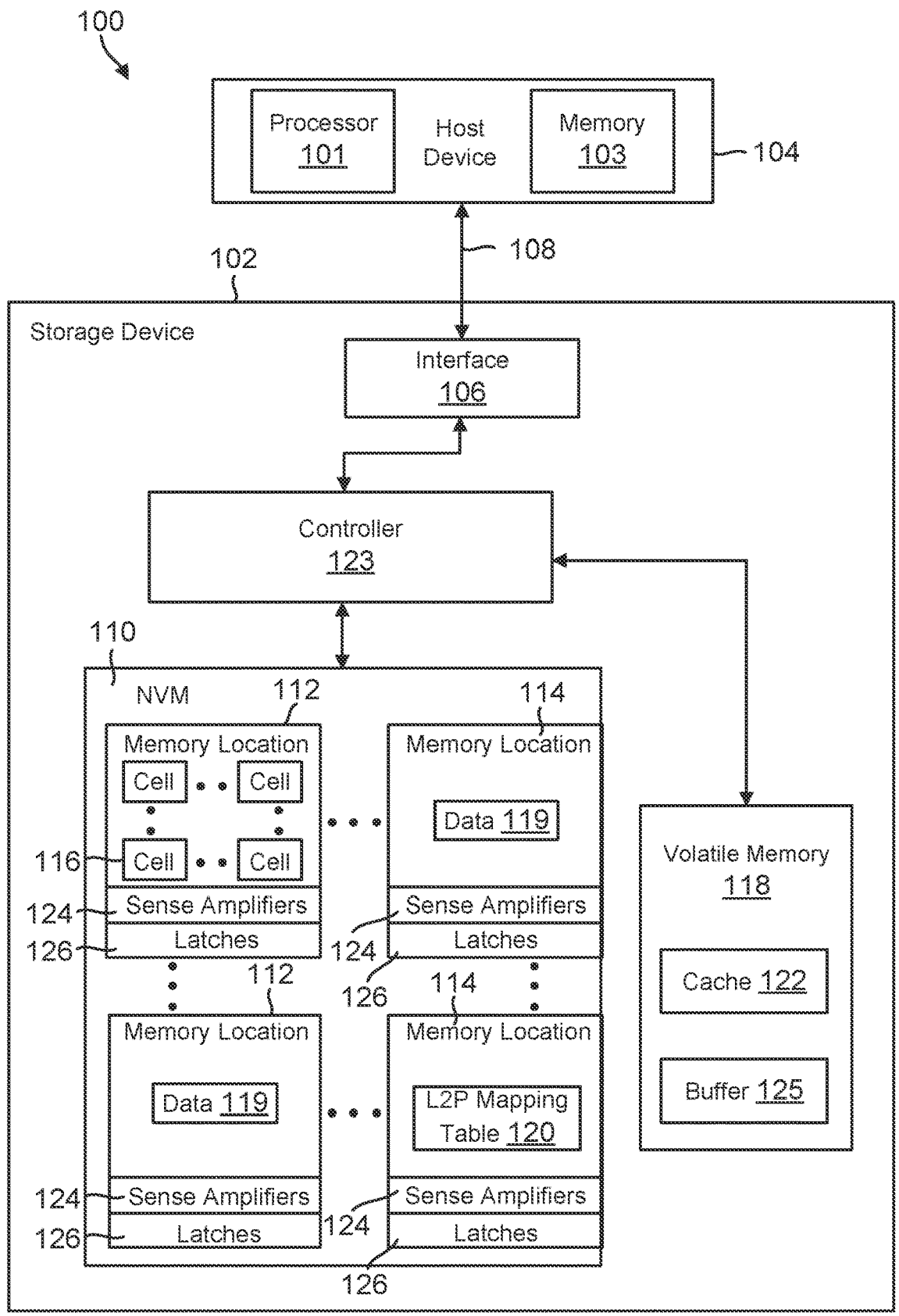
FIG. 1 is a block diagram illustrating an exemplary embodiment of a storage device in communication with a host device.

FIG. 1 shows an exemplary block diagram 100 of a storage device 102 which communicates with a host device 104 (also "host") according to an exemplary embodiment. The host 104 and the storage device 102 may form a system, such as a computer system (e.g., server, desktop, mobile/laptop, tablet, smartphone, etc.). The components of FIG. 1 may or may not be physically co-located. In this regard, the host 104 may be located remotely from storage device 102. Although FIG. 1 illustrates that the host 104 is shown separate from the storage device 102, the host 104 in other embodiments may be integrated into the storage device 102, in whole or in part. Alternatively, the host 104 may be distributed across multiple remote entities, in its entirety, or alternatively with some functionality in the storage device 102.

Those of ordinary skill in the art will appreciate that other exemplary embodiments can include more or less than those elements shown in FIG. 1 and that the disclosed processes can be implemented in other environments. For example, other exemplary embodiments can include a different number of hosts communicating with the storage device 102, or multiple storage devices 102 communicating with the host(s).

The host device 104 may store data to, and/or retrieve data from, the storage device 102. The host device 104 may include any computing device, including, for example, a computer server, a network attached storage (NAS) unit, a desktop computer, a notebook (e.g., laptop) computer, a tablet computer, a mobile computing device such as a smartphone, a television, a camera, a display device, a digital media player, a video gaming console, a video streaming device, or the like. The host device 104 may include at least one processor 101 and a host memory 103. The at least one processor 101 may include any form of hardware capable of processing data and may include a general purpose processing unit (such as a central processing unit (CPU)), dedicated hardware (such as an application specific integrated circuit (ASIC)), digital signal processor (DSP), configurable hardware (such as a field programmable gate array (FPGA)), or any other form of processing unit configured by way of software instructions, firmware, or the like. The host memory 103 may be used by the host device 104 to store data or instructions processed by the host or data received from the storage device 102. In some examples, the host memory 103 may include non-volatile memory, such as magnetic memory devices, optical memory devices, holographic memory devices, flash memory devices (e.g., NAND or NOR), phase-change memory (PCM) devices, resistive random-access memory (ReRAM) devices, magnetoresistive random-access memory (MRAM) devices, ferroelectric random-access memory (F-RAM), and any other type of non-volatile memory devices. In other examples, the host memory 103 may include volatile memory, such as random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, and the like). The host memory 103 may also include both non-volatile memory and volatile memory, whether integrated together or as discrete units.

The host interface 106 is configured to interface the storage device 102 with the host 104 via a bus/network 108, and may interface using, for example, Ethernet or WiFi, or a bus standard such as Serial Advanced Technology Attachment (SATA), PCI express (PCIe), Small Computer System Interface (SCSI), or Serial Attached SCSI (SAS), among other possible candidates. Alternatively, the host interface 106 may be wireless, and may interface the storage device 102 with the host 104 using, for example, cellular communication (e.g. 5G NR, 4G LTE, 3G, 2G, GSM/UMTS, CDMA One/CDMA2000, etc.), wireless distribution methods through access points (e.g. IEEE 802.11, WiFi, HiperLAN, etc.), Infra Red (IR), Bluetooth, Zigbee, or other Wireless Wide Area Network (WWAN), Wireless Local Area Network (WLAN), Wireless Personal Area Network (WPAN) technology, or comparable wide area, local area, and personal area technologies.

The storage device 102 includes a memory. For example, in the exemplary embodiment of FIG. 1, the storage device 102 may include a non-volatile memory (NVM) 110 for persistent storage of data received from the host 104. The NVM 110 can include, for example, flash integrated circuits, NAND memory (e.g., single-level cell (SLC) memory, multi-level cell (MLC) memory, triple-level cell (TLC) memory, quad-level cell (QLC) memory, penta-level cell (PLC) memory, or any combination thereof), or NOR memory. The NVM 110 may include a plurality of memory locations 112 which may store system data for operating the storage device 102 or user data received from the host for storage in the storage device 102. For example, the NVM may have a cross-point architecture including a 2-D NAND array of memory locations 112 having n rows and m columns, where m and n are predefined according to the size of the NVM. In the exemplary embodiment of FIG. 1, each memory location 112 may be a die 114 including multiple planes each including multiple blocks of multiple cells 116. Alternatively, each memory location 112 may be a plane including multiple blocks of the cells 116. The cells 116 may be single-level cells, multi-level cells, triple-level cells, quad-level cells, and/or penta-level cells, for example. Other examples of memory locations 112 are possible; for instance, each memory location may be a block or group of blocks. The vernacular may differ for this type of partitioning, and may include sections, meta-sections, locations, etc.

Each memory location may include one or more blocks in a 3-D NAND array. Each memory location 112 may include one or more logical blocks which are mapped to one or more physical blocks. Alternatively, the memory and each memory location may be implemented in other ways known to those skilled in the art.

The storage device 102 also includes a volatile memory 118 that can, for example, include a Dynamic Random Access Memory (DRAM) or a Static Random Access Memory (SRAM). Data stored in volatile memory 118 can include data read from the NVM 110 or data to be written to the NVM 110. In this regard, the volatile memory 118 can include a write buffer or a read buffer for temporarily storing data. While FIG. 1 illustrates the volatile memory 118 as being remote from a controller 123 of the storage device 102, the volatile memory 118 may be integrated into the controller 123, in part or in whole. The volatile memory may include static random access memory (RAM), include transfer RAM (TRAM), XRAM, or other designations. The controller may also include a hardware accelerator which may be associated with buffers (see, e.g., FIGS. 4 and 8). TRAM may be used to store incoming host data received via a write instruction, for example.

The memory (e.g. NVM 110) is configured to store data 119 received from the host device 104. The data 119 may be stored in the cells 116 of any of the memory locations 112. As an example, FIG. 1 illustrates data 119 being stored in different memory locations 112, although the data may be stored in the same memory location. In another example, the memory locations 112 may be different dies, and the data may be stored in one or more of the different dies.

Each of the data 119 may be associated with a logical address. For example, the NVM 110 may store a logical-to-physical (L2P) mapping table 120 for the storage device 102 associating each data 119 with a logical address. The L2P mapping table 120 stores the mapping of logical addresses specified for data written from the host 104 to physical addresses in the NVM 110 indicating the location(s) where each of the data is stored. This mapping may be performed by the controller 123 of the storage device. The L2P mapping table may be a table or other data structure which includes an identifier such as a logical block address (LBA) associated with each memory location 112 in the NVM where data is stored. While FIG. 1 illustrates a single L2P mapping table 120 stored in one of the memory locations 112 of NVM to avoid unduly obscuring the concepts of FIG. 1, the L2P mapping table 120 in fact may include multiple tables stored in one or more memory locations of NVM.

Figure 2:
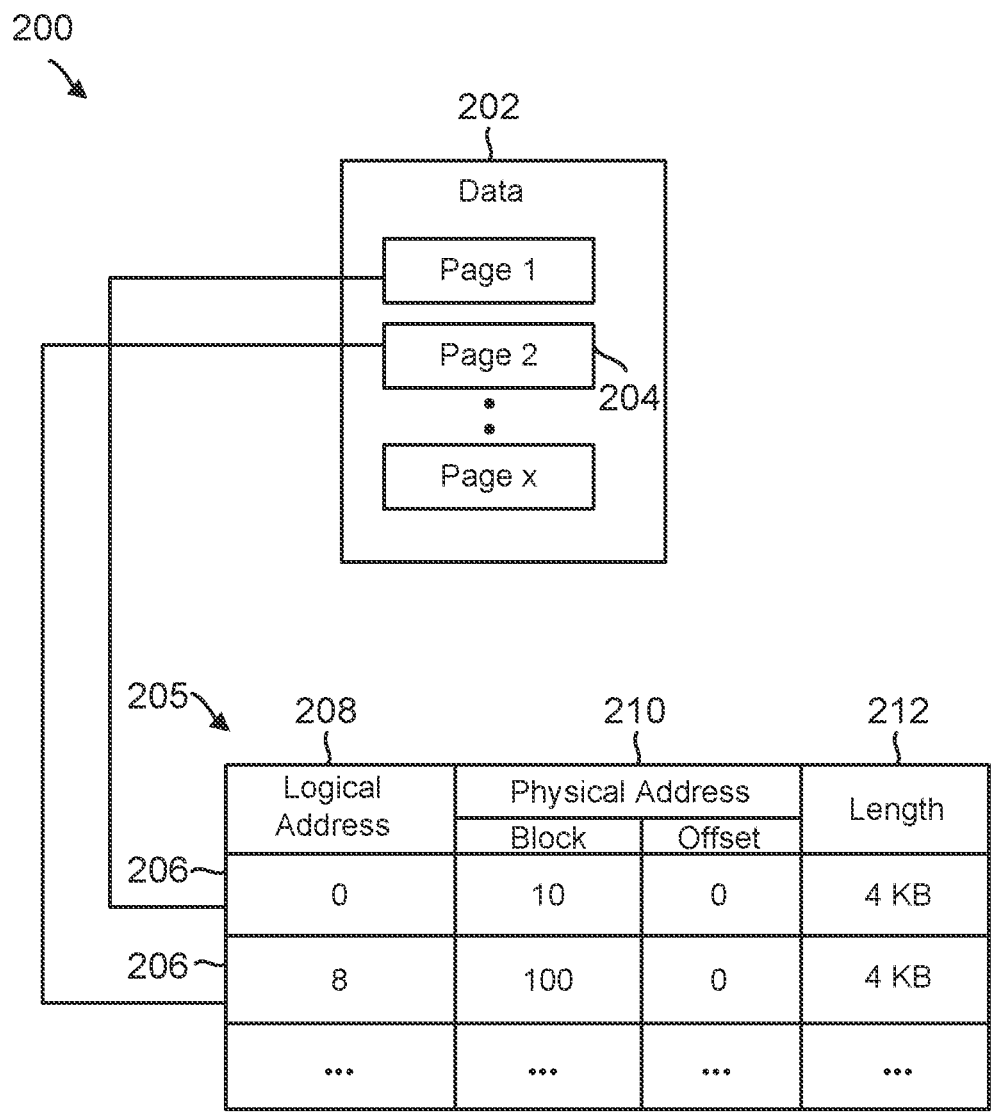
FIG. 2 is a conceptual diagram illustrating an example of a logical-to-physical mapping table in a non-volatile memory of the storage device of FIG. 1.

FIG. 2 is a conceptual diagram 200 of an example of an L2P mapping table 205 illustrating the mapping of data 202 received from a host device to logical addresses and physical addresses in the NVM 110 of FIG. 1. The data 202 may correspond to the data 119 in FIG. 1, while the L2P mapping table 205 may correspond to the L2P mapping table 120 in FIG. 1. In one exemplary embodiment, the data 202 may be stored in one or more pages 204, e.g., pages 1 to x, where x is the total number of pages of data being written to the NVM 110. Each page 204 may be associated with one or more entries 206 of the L2P mapping table 205 identifying a logical block address (LBA) 208, a physical address 210 associated with the data written to the NVM, and a length 212 of the data. LBA 208 may be a logical address specified in a write command for the data received from the host device. Physical address 210 may indicate the block and the offset at which the data associated with LBA 208 is physically written. Length 212 may indicate a size of the written data (e.g. 4 KB or some other size).

Referring back to FIG. 1, the volatile memory 118 also stores a cache 122 for the storage device 102. The cache 122 includes entries showing the mapping of logical addresses specified for data requested by the host 104 to physical addresses in NVM 110 indicating the location(s) where the data is stored. This mapping may be performed by the controller 123. When the controller 123 receives a read command or a write command for data 119, the controller checks the cache 122 for the logical-to-physical mapping of each data. If a mapping is not present (e.g. it is the first request for the data), the controller accesses the L2P mapping table 120 and stores the mapping in the cache 122. When the controller 123 executes the read command or write command, the controller accesses the mapping from the cache and reads the data from or writes the data to the NVM 110 at the specified physical address. The cache may be stored in the form of a table or other data structure which includes a logical address associated with each memory location 112 in NVM where data is being read. Part or all of the cache may be included as part of the controller in other embodiments.

The NVM 110 includes sense amplifiers 124 and data latches 126 connected to each memory location 112. For example, the memory location 112 may be a block including cells 116 on multiple bit lines, and the NVM 110 may include a sense amplifier 124 on each bit line. Moreover, one or more data latches 126 may be connected to the bit lines and/or sense amplifiers. The data latches may be, for example, shift registers. When data is read from the cells 116 of the memory location 112, the sense amplifiers 124 sense the data by amplifying the voltages on the bit lines to a logic level (e.g. readable as a '0' or a '1'), and the sensed data is stored in the data latches 126. The data is then transferred from the data latches 126 to the controller 123, after which the data is stored in the volatile memory 118 until it is transferred to the host device 104. When data is written to the cells 116 of the memory location 112, the controller 123 stores the programmed data in the data latches 126, and the data is subsequently transferred from the data latches 126 to the cells 116.

The storage device 102 includes a controller 123 which includes circuitry such as one or more processors for executing instructions and can include a microcontroller, a Digital Signal Processor (DSP), an Application-Specific Integrated Circuit (ASIC), a Field Programmable Gate Array (FPGA), hard-wired logic, analog circuitry and/or a combination thereof.

The controller 123 is configured to receive data transferred from one or more of the cells 116 of the various memory locations 112 in response to a read command. For example, the controller 123 may read the data 119 by activating the sense amplifiers 124 to sense the data from cells 116 into data latches 126, and the controller 123 may receive the data from the data latches 126. The controller 123 is also configured to program data into one or more of the cells 116 in response to a write command. For example, the controller 123 may write the data 119 by sending data to the data latches 126 to be programmed into the cells 116. The controller 123 is further configured to access the L2P mapping table 120 in the NVM 110 when reading or writing data to the cells 116. For example, the controller 123 may receive logical-to-physical address mappings from the NVM 110 in response to read or write commands from the host device 104, identify the physical addresses mapped to the logical addresses identified in the commands (e.g. translate the logical addresses into physical addresses), and access or store data in the cells 116 located at the mapped physical addresses.

The controller 123 and its components may be implemented with embedded software that performs the various functions of the controller described throughout this disclosure. Alternatively, software for implementing each of the aforementioned functions and components may be stored in the NVM 110 or in a memory external to the storage device 102 or host device 104, and may be accessed by the controller 123 for execution by the one or more processors of the controller 123. Alternatively, the functions and components of the controller may be implemented with hardware in the controller 123, or may be implemented using a combination of the aforementioned hardware and software. In other cases, the functions and components or portions thereof may be implemented with firmware.

In operation, the host device 104 stores data in the storage device 102 by sending a write command to the storage device 102 specifying one or more logical addresses (e.g., LBAs) as well as a length of the data to be written. The interface element 106 receives the write command, and the controller allocates a memory location 112 in the NVM 110 of storage device 102 for storing the data. The controller 123 stores the L2P mapping in the NVM (and the cache 122) to map a logical address associated with the data to the physical address of the memory location 112 allocated for the data. The controller also stores the length of the L2P mapped data. The controller 123 then stores the data in the memory location 112 by sending it to one or more data latches 126 connected to the allocated memory location, from which the data is programmed to the cells 116.

The host 104 may retrieve data from the storage device 102 by sending a read command specifying one or more logical addresses associated with the data to be retrieved from the storage device 102, as well as a length of the data to be read. The interface 106 receives the read command, and the controller 123 accesses the L2P mapping in the cache 122 or otherwise the NVM to translate the logical addresses specified in the read command to the physical addresses indicating the location of the data. The controller 123 then reads the requested data from the memory location 112 specified by the physical addresses by sensing the data using the sense amplifiers 124 and storing them in data latches 126 until the read data is returned to the host 104 via the host interface 106.

Figure 3:
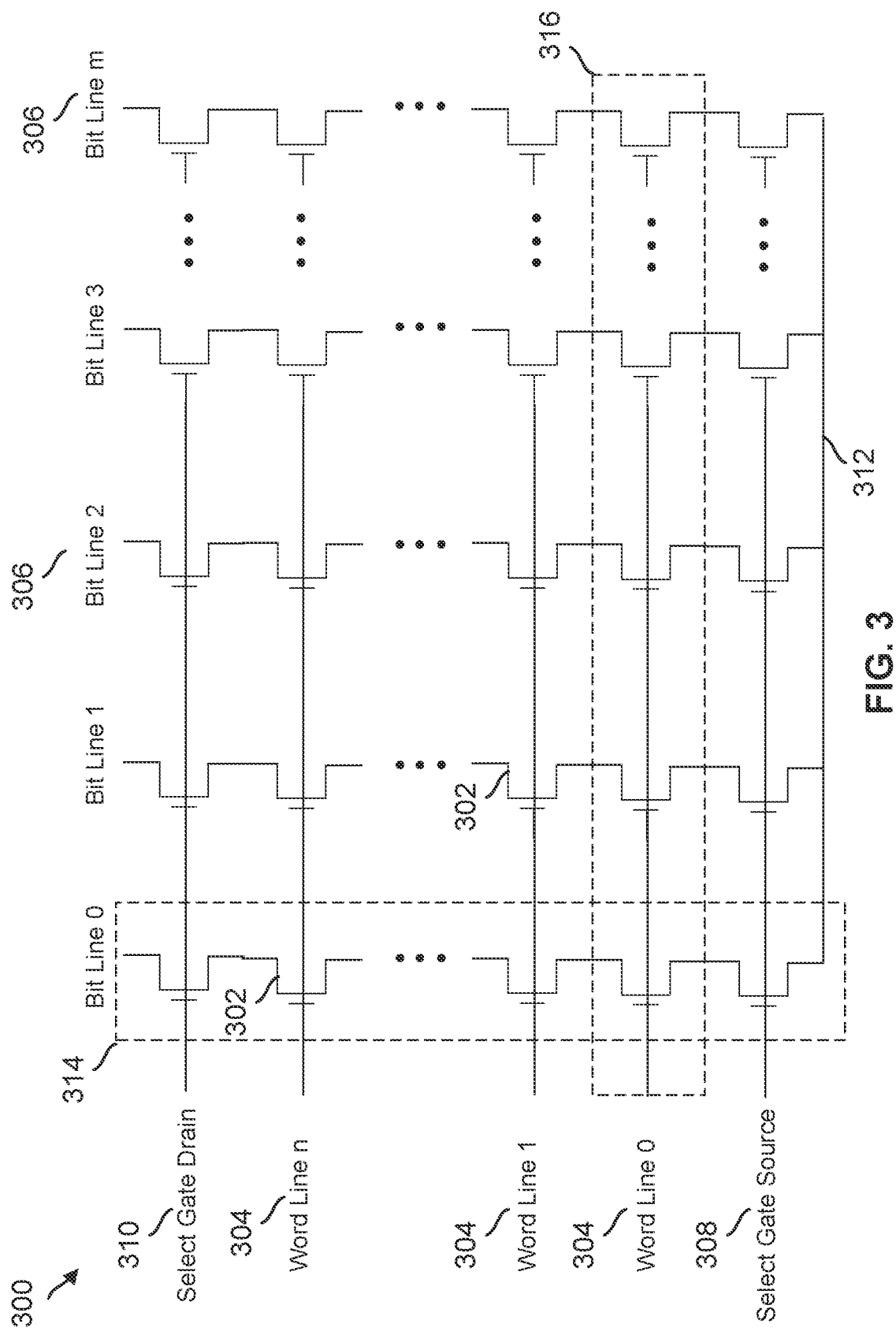
FIG. 3 is a conceptual diagram illustrating an example of an array of memory cells in the storage device of FIG. 1.

FIG. 3 illustrates an example of a NAND memory array 300 of cells 302. Cells 302 may correspond to cells 116 in the NVM 110 of FIG. 1. Multiple cells 302 are coupled to word lines 304 and bit lines 306. For example, the memory array 300 may include n word lines and m bit lines within a block of a die 114 of the NVM 110, where n and m are predefined according to the size of the block. Each word line and bit line may be respectively associated with a row and column address, which the controller 123 may use to select particular word lines and bit lines (e.g. using a row and column decoder). For example, word lines 0-n may each be associated with their own row address (e.g. word line 0 may correspond to word line address 0, word line 1 may correspond to word line address 1, etc.), and bit lines 0-m may each be associated with their own column address (e.g. bit line 0 may correspond to bit line address 0, bit line 1 may correspond to bit line address 1, etc.). Select gate source (SGS) cells 308 and select gate drain (SGD) cells 310 are coupled to the memory cells 302 on each bit line 306. The SGS cells 308 and SGD cells 310 connect the memory cells 302 to a source line 312 (e.g. ground) and bit lines 306, respectively. A string 314 may include a group of cells 302 (including SGS and SGD cells 308, 310) coupled to one bit line within a block, while a page 316 may include a group of cells 302 coupled to one word line within the block.

Sustained sequential writes (SSWs) are an important benchmark for NVM device performance. SSWs occur, for example, when a host device issues a large number of successive write instructions to the storage device. SSW performance may include the write performance a storage device is able to provide after the device, e.g., an SSD, has written data in an amount more than the capacity of the single-level cell SLC cache, or in other cases after the device is logically deemed to be at full capacity. An SLC cache may include a cache in a multi-level cell (MLC) storage apparatus that is equivalent in width to that of one data chunk of an integer number of chunks that can be simultaneously read by an MLC storage location of the device. The SLC cache may be populated with one or more such chunks or sections until the SLC cache becomes full or the requisite number of chunks (e.g., 3, 4, 5, etc.) are transferred to an MLC location for storage.

SSW performance is typically worse than a simple write burst, because in addition to handling the host writes, folding is likely required in sustained mode. Folding occurs when moving multiple copies of an SLC section of data into an MLC section. For example, in triple-level cell (TLC) memories, three sections of SLC data may be first copied into an SLC cache or other memory. The three buffered sections may then be moved or folded into the larger TLC non-volatile section. Folding is unavoidable because the SLC cache (which holds the blocks to SLC capacity) is insufficient to store the entire device capacity with data. Accordingly, once the SLC cache gets filled to capacity (e.g., SLC blocks capacity), the data needs to be moved to the TLC/QLC or other MLC via folding.

Another phenomenon that may degrade performance by interfering during a sustained write is compaction. While the storage device is idle, compaction may increase the amount of usable space and improve write performance. However, when it becomes necessary during a SSW, performance may suffer as a result.

Relocation data for the purposes of this disclosure is data slated to be folded or compacted. The more the relocation data, the more likely folding or compaction will degrade SSW performance, and write performance in general.

The problems that arise due to folding and relocation data may differ depending on various factors, including the capacity and speed of the storage device. In a lower capacity device, typically the number of meta dies are less. A meta die may include a plurality of dies. A meta die page or meta page may be terms used to describe the maximum width of an SLC traversing the meta die (see FIG. 5). (A meta-section may be used to describe the maximum width of a memory write in general including without limitation an SLC, but regardless of the number of dies). For example, a storage device may be built using a plurality of dies, as described below, and the physical addresses of memory locations may traverse more than one die. Some types of 512 Gigabyte storage devices have one meta die (e.g., four total dies), and others may have two meta dies. It will be appreciated by those skilled in the art that a page write may be, and typically is, smaller than a meta die or meta-section. A die may be able to write to a storage device in a fraction of the width of the meta die or meta-section, such as 32 KB KB page in a 128 KB meta page or meta-section, for example.

As an example of performance issues arising in lower capacity devices in the context of SSWs, an exemplary 512

GB MLC storage with two meta pages may be considered. In such a device, after all the meta-die reads for one meta die page are completed, the controller (e.g., executing the firmware) may have to wait to read the next meta die page of the first meta die until the MLC program for the first meta die page of the first meta die is completed. FIG. 4 is a table 400 illustrating an example programming time of different versions of a storage device. That is to say, FIG. 4 shows the programming speed (tProg) of the MLC, including at lower capacities. The SLC version 404 is shown to be the fastest, with the TLC version 406 longer and hence slower. In the case of a quad-level version 408 (QLC), the QLC word-line is performed in Foggy-Fine style as described below, with performance even slower.

Figure 5:
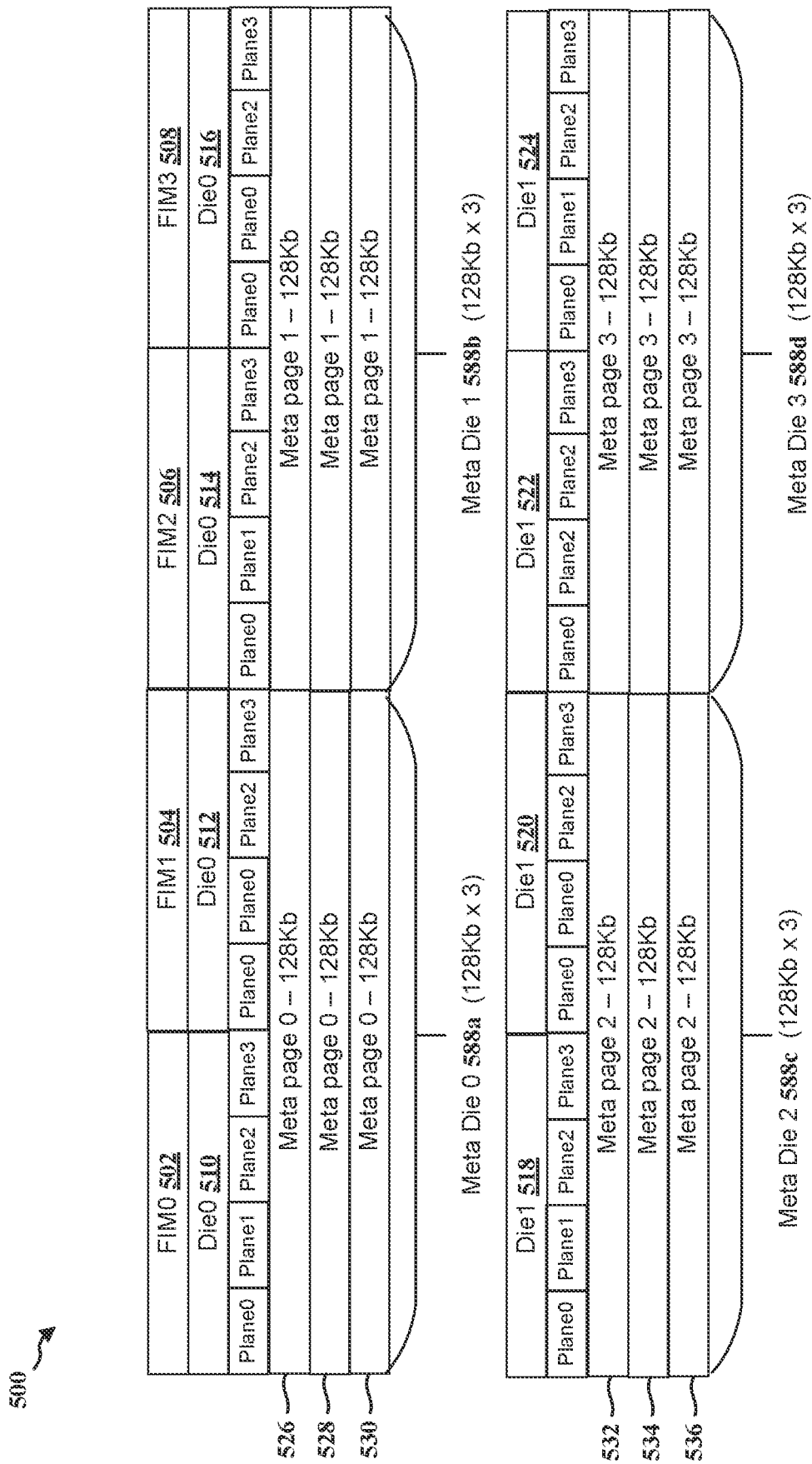
FIG. 5 is a conceptual diagram illustrating an example of a data structure for a storage device partitioned in a configuration.

FIG. 5 is a conceptual diagram illustrating an example of a data structure for a storage device 500 partitioned in an exemplary configuration. The configuration is exemplary in nature, and others are possible. The example shows a 1 Terabyte (TB) TLC device. It is noteworthy that the total memory is approximately 1.5 TB because, as appreciated by practitioners in the art, the storage device is over-provisioned. The example device includes four flash interface modules (FIM) 502, 504, 506 and 508 corresponding respectively to FIM0, FIM1, FIM2, and FIM3. Each FIM 502, 504, 506, [an]] and 508 includes two physical die in this embodiment. FIM0 502 includes Die0 510 and Die1 518. FIM1 504 includes Die0 512 and Die1 520. FIM2 506 includes Die0 514 and Die1 522. FIM3 508 includes Die0 516 and Die1 524. In various embodiments including as shown in FIG. 5, each die 510, 512, 514, 516, 518, 520, 522 and 524 may be partitioned into four planes: Plane0, Plane1, Plane2, and Plane3. In various embodiments, each plane is further partitioned into a plurality of blocks. In various embodiments, each block may be partitioned into individual pages for reading and writing. The manner that the storage device is partitioned may vary widely depending on the implementation and memory technology involved without departing from the spirit or scope of the disclosure.

With continued reference to FIG. 5, storage device 500 is a TLC device, as there are three meta die pages (and separate TLC memory locations (FIG. 6)). For example, Die0 510 and Die0 512 of FIM0 502 and FIM1 504 include three meta page 0 (526, 528 and 530). Die0 514 and Die0 516 of FIM2 506 and FIM3 508 include three meta page 1, shown in the same respective rows 526, 528 and 530. Similarly Die1 518 and Die1 520 of FIM0 502 and FIM1 504 include three meta page 2 (532, 534, 536). Die1 522 and Die1 524 of FIM2 506 and FIM3 508 include three meta page 3 (also in the same row as 532, 534 and 536). The architecture shown may include a single printed circuit board on which the eight dies 510, 512, 514, 516, 518, 520, 522 and 524 in an addressable array. In some embodiments, the various sections within the meta-sections (meta pages in this example) may be addressable using row and column addresses, such as word and bit lines in NAND flash. In some embodiments, the meta die page may be the maximum addressable unit. NOR flash or any other flash embodiments may be equally suitable, as the addressing scheme will also vary based on the implementation and memory technology.

The storage device 500 has four meta dies, each meta die corresponding to three meta pages: meta die 0 588a, meta die 1 588b, meta die 2 588c, and meta die 3 588d. An example of operation of the storage device 500 and folding relocation data is now considered. Three SLC meta pages (e.g., meta die page 1s of Die0 514 and Die0 516) may successively be read from the host to three different SLC blocks in relocation (RLC) buffers, which may, for example, be included within buffer 125 of volatile memory 118 (FIG. 1) or TRAM 739 (FIG. 76). For purposes of the present disclosure, the term "buffer" and "buffers" may be used interchangeably. After the three SLC reads into the RLC buffer, the data in the RLC buffer is transferred back to the NAND latches 126 (FIG. 1) to program the TLC meta die 0 (588a), which may be a plurality of word lines corresponding to the three meta die page Os. Until this data transfer is completed, no other SLC reads can take place. This process of retrieving the three meta pages is repeated for all meta dies 0-4 (588a-d). By the time control returns to meta die 0 (588a), the TLC programming for the meta die 0 (588a) has since been finished the meta die 0 will be idle.

In the alternative case of a 2 TB storage device (having eight meta dies in this example), the meta die 0 would experience an even longer waiting duration, remaining idle until the folding operations to all the meta dies are completed.

More generally, in order to obtain the best sequential write performance from a storage device, all planes, dies, meta dies, or other partitions should work in parallel. For the storage device 500, because there are practical limitations on the amount of SRAM, read senses and data transfers on all meta dies cannot be performed in parallel.

In the case of a QLC storage device, the QLC word lines are programmed in Foggy-Fine style. First, WordLine0 (WL0) is programmed in Foggy style. Then WordLine 1 (WL1) is programmed in Foggy style. Thereafter, WL0 is picked up again to be programmed in Fine style, followed by WL1 which goes again for Fine programming. Due to the limited RLC buffer capacity, in the Foggy program case the SLC data is read once and during the Fine programming of the same word lines, the same data is read again. This repeated sequence of data senses and transfers in the case of a QLC device degrades SSW performance even further.

In sum, SLC meta pages/word lines can be read from each of three or four blocks (depending on whether the device is a TLC, QLC, or other MLC, for example) and stored in SRAM (TRAM) buffers having a capacity of 384 KB for TLC devices and 512 KB for QLC devices, in examples where the memory technology is identical. This data may thereupon be sent to the NAND latches 126 (FIG. 1) and then programmed to the TLC/QLC as described. The TLC (MLC) programming can begin once the first set of 384 KB, for example, is sent to the storage device (e.g., NAND flash). This programming of TLC (MLC) for one meta die (e.g., 588c) takes longer than reading data of one meta die page for all meta dies in SLC for lower capacities, as described above. Hence, the MLC programming speed limits SSW performance.

However, for higher capacities, MLC programming generally concludes before the controller (e.g., via firmware) returns to the first meta die to read the next pages.

Accordingly, the second page SLC reads for the first meta die must wait until the SRAM buffers are freed by the last meta die. This latency limits SSW performance in higher capacity devices. Similar techniques may be implemented for other MLC products and memory technologies. Additionally, for QLC products, Foggy-Fine style is used, which degrades performance.

Figure 6:
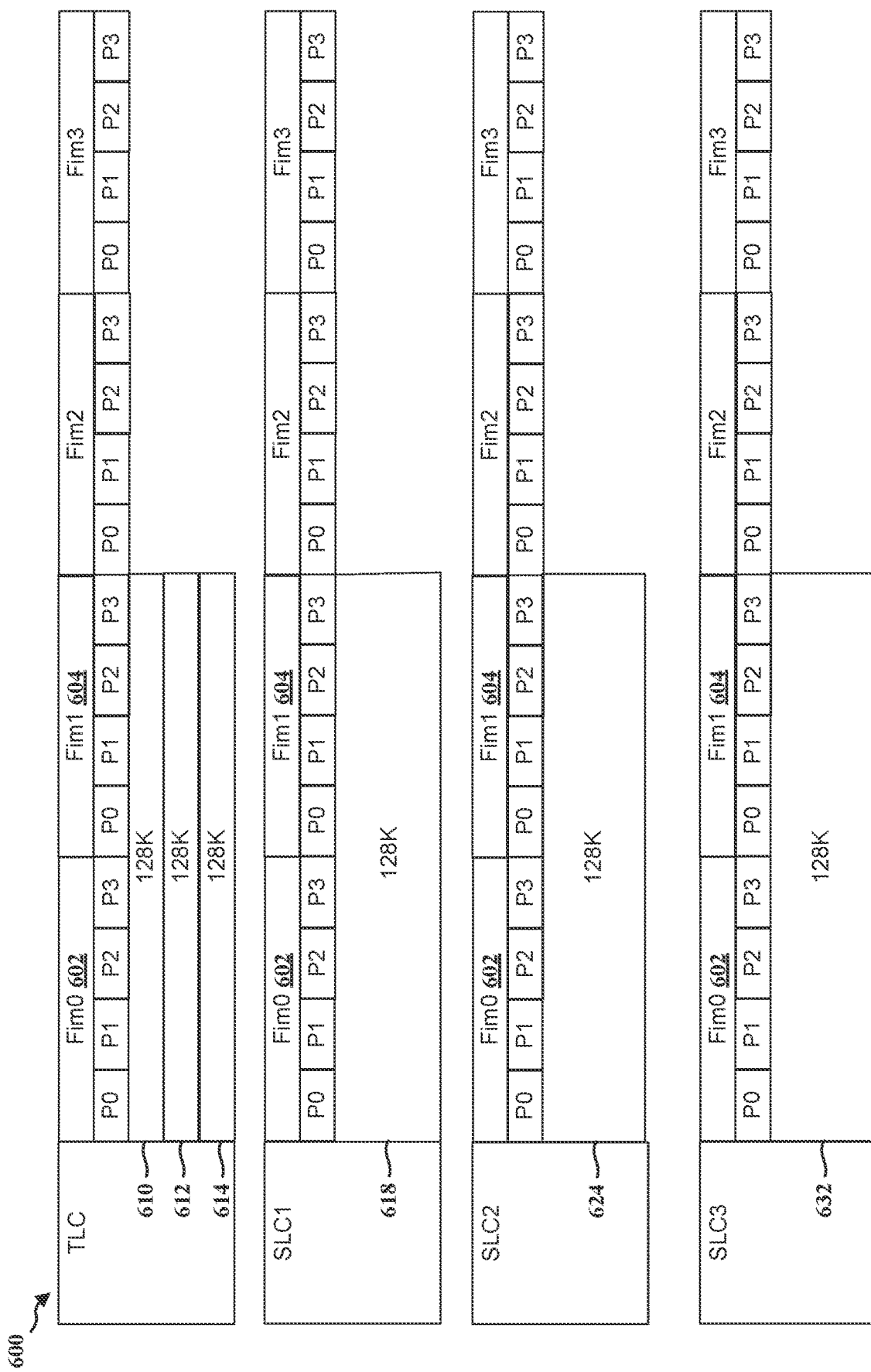
FIG. 6 is a data structure showing an example of folding relocated data into a triple-level cell.

FIG. 6 is a data structure showing an example of folding relocated data in a triple-level cell (TLC) storage device 600. The data may be partitioned using four Flash Interface modules including FIM0 602 and FIM1 604, as well as FIM2 and FIM3 (the latter two not involved in the example folding operation. Each FIM0 602 and FIM1 604 may be further partitioned into respective sets of four planes P0-P3, e.g., each of the four planes distributed across one die. FIM0 and FIM1 include three SLC storage locations SLC1 618, SLC2 624, and SLC3 632. Each of the storage locations may include a block or portion of data, or a single meta die page. FIM0 and FIM1 also include a TLC portion that includes three meta pages 610, 612, 614 to form a TLC meta die.

In an example fold operation, the controller retrieves the 128 KB data chunk from the first memory location 618 and places it in SRAM (e.g., TRAM) or a non-volatile SLC storage location in some embodiments. Next, the controller fetches the second 128 KB data chunk from the memory location 624 at SLC2 and stores the second chunk in SRAM. Thereafter, the controller retrieves the third 128 KB data chunk from the memory location 632 at SLC3 and stores the third chunk in SRAM. Having sufficient data to fill a TLC memory location, the controller read senses and latches the data into the TLC storage location, where memory locations of the three data chunks from SLC1, SLC2, and SLC3 are written into TLC memory location comprising meta page 610, meta page 612, and meta page 614.

Figure 7:
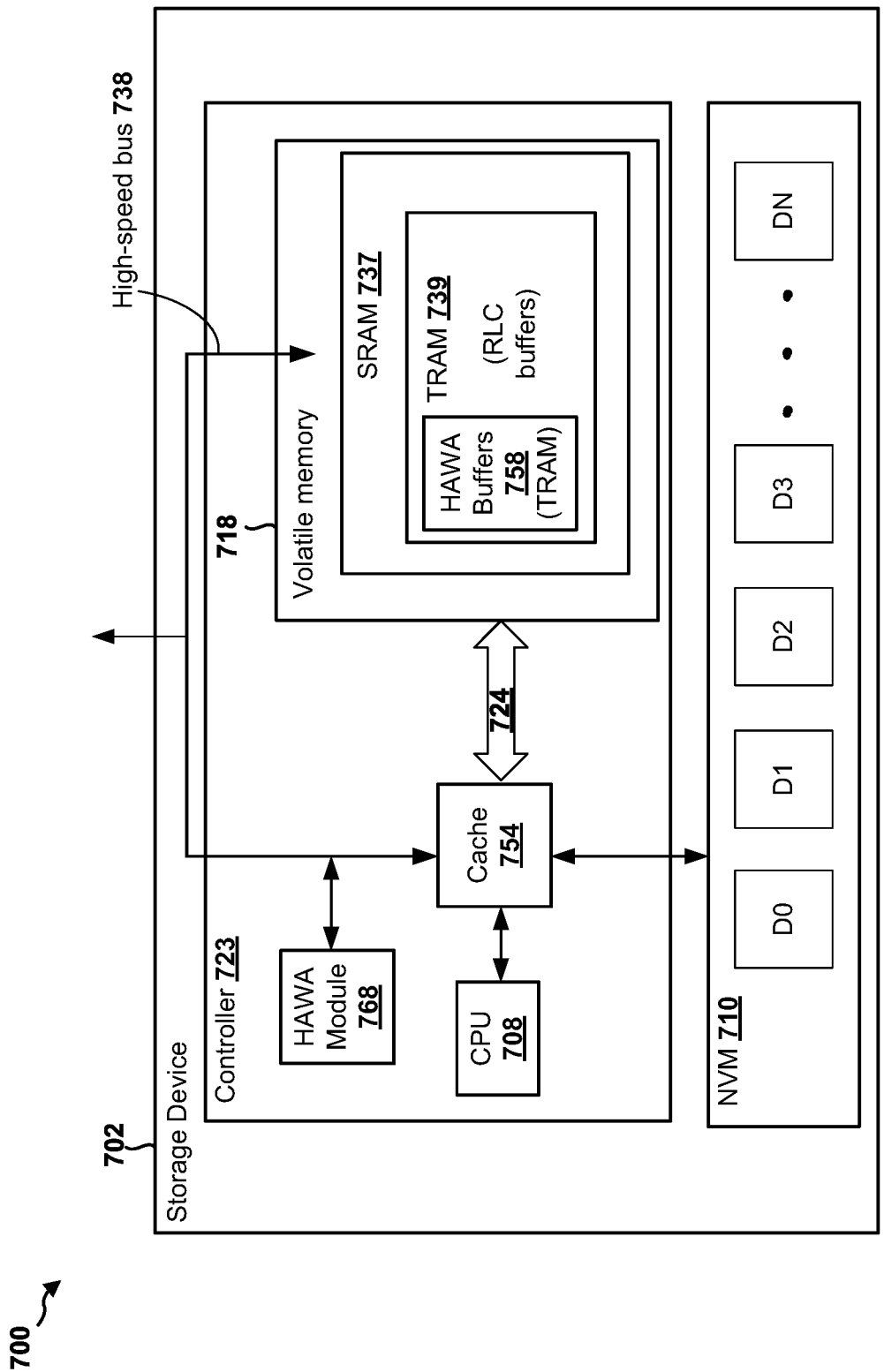
FIG. 7 is a conceptual diagram illustrating an example of an array of blocks in one embodiment of the storage device.

FIG. 7 is a conceptual diagram 700 illustrating an example of an array of blocks in one configuration of the storage device 702. In the embodiment shown, controller 723 includes CPU 708, a hardware acceleration (HAWA) module 768, and cache 754 for use in maintaining recent reads or writes. In addition, controller 723 includes volatile memory 718. Volatile memory may include SRAM 737. Different categories of buffers and memory may be designated in SRAM 737. Examples include XRAM and TRAM. TRAM 739 may be used for the RLC buffers in the above-described example. SRAM 737 may also include HAWA buffers 758, which are buffers in memory that hold data for host accumulation (e.g., host writes) that were retrieved from the host by HAWA module 768 to increase overall SSW performance.

For example, the HAWA module 768 may allocate HAWA buffers 758 for incoming host writes using high speed bus 738. HAWA buffers 758 may also be TRAM, or XRAM or some other designated memory. As an example, when the HAWA module 768 determines that space is available in buffers 758, the HAWA module 768 may retrieve data from the dynamic RAM (DRAM) (not shown) using high speed bus 738. Thus, HAWA module 768 is used during host writes to speed up operation concurrent with the activities of the CPU 708 and cache 754 over the high speed bus 738. As another example, the HAWA module 768 may retrieve a 32 KB data chunk from DRAM in the host, create a 32 KB context (e.g., information including the number of pointers to a TRAM location, LBA, length, ID, etc.). The HAWA module 768 may then inform the controller 723 (using the flash translation layer (FTL)) of the retrieval.

The controller 723 may also use SRAM 737 for host data accumulation during host writes. The controller 723 may also use TRAM 739 as a relocation buffer during relocation (folding/compaction). In the example of TLC folding, the controller 723 may issue reads on three SLC blocks, reading 128 KB on each block (as in FIG. 5) and accumulate 128×3=384 KB in the HAWA buffers 758_or TRAM 739. Thereupon, the controller 723 may issue a write to one of the blocks or other sections or meta-sections (e.g., one of TLC meta dies 588*a-d*.)

In addition, after sending the sense command to the NVM, the stored data can be retrieved (e.g., for folding) using latches 126 (FIG. 1) once the data sense operation is complete. The controller 123/723 can toggle out via the latches data to TRAM 739.

Referring still to FIG. 7, the controller 723 or CPU 708 can transfer data to and from cache 754 and volatile memory 718 using internal bus 724. Controller 723 is coupled to NVM 710, which may include a plurality of dies D0-DN. NVM in other embodiments may include a large array of dies or meta dies. In the example of FIG. 7, the controller encompasses functionality other than the internal functions of the NVM 710.

In short, in folding, a meta die page from the same meta die of three SLC sources are read consecutively into SRAM buffers (e.g., TRAM). However, the next meta die cannot read its second meta die page unless the SRAM buffers are freed from the last meta die. As noted, this delay in the fold/compaction causes a delay in the SLC reads due to the capacity limitations that cause the lack of SRAM buffers. While optimal performance generally requires operations to be in parallel, for SSW the limited amount of SRAM means that operations like read senses and data transfers on parallel meta dies must be performed successively rather than in parallel.

The SSW performance can be improved by increasing the allocation of the RLC buffers to be able to read more meta pages. In some cases RLC buffers in TRAM 739 may be reserved from a portion of HAWA buffers in 758 using HAWA module 768. To increase the allocation of the RLC buffers, the memory must be reserved from other parts of SRAM 737 or by increasing the size of the SRAM 737. However, these actions may affect adversely other performance benchmarks and may increase both the cost and the size of the storage device 702.

Accordingly, in an aspect of the disclosure, the use of Host Memory Buffers (HMBs) on the host device to fetch RLC buffers instead of fetching it from the already taxed local SRAM is proposed. The allocation by the controller or the HAWA module of HMBs to fetch RLC buffers assists in freeing up SRAM space on the storage device for HAWA buffers. The above-described delays imposed by relocation processes mixed with handling sustained host writes can be removed, and all meta die sense operations can be accomplished in parallel due to the increase in SRAM buffer capacity. The use of the HMBs from the host device for relocation data together with the HAWA buffers, e.g., for host write accumulation, provides the optimal capabilities of having an optimal number and type of buffers to handle SSW and folding as close as possible to parallel operation. In turn, the best possible SSW performance is achievable.

Figure 8:
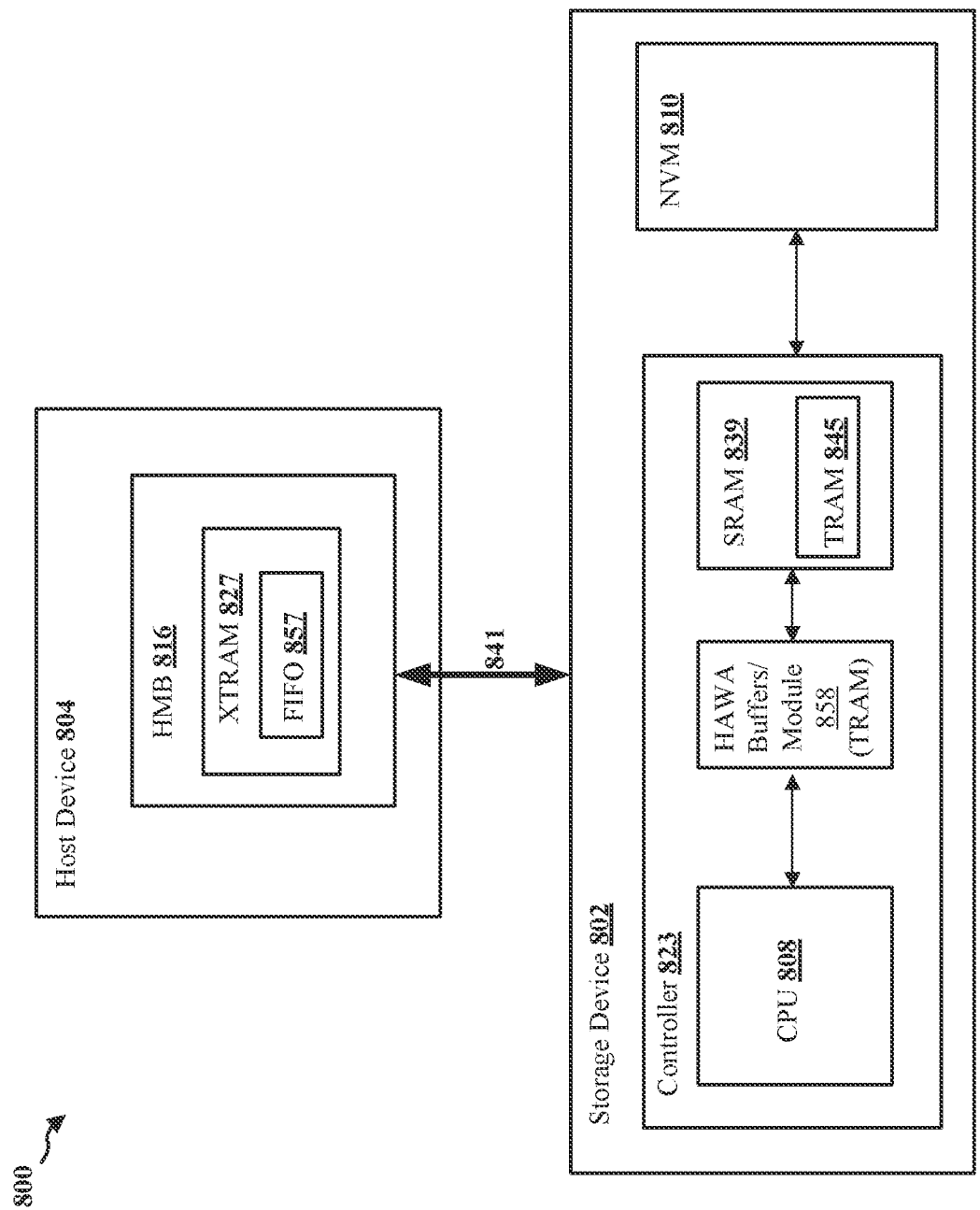
FIG. 8 is block diagram illustrating exemplary components of a storage device and a host device according to an embodiment.

FIG. 8 is block diagram 800 illustrating exemplary components of a host device 804 and storage device 802 according to an embodiment. The storage device 802 is similar to the storage device 702 in FIG. 7. In the embodiment of FIG. 8, the main functions (FTL, firmware, hardware consolidation, buffering, caching, etc.) are consolidated in the controller 823. In this example, in addition to CPU 808 for handling the panoply of internal and I/O operations, the HAWA module is localized with the HAWA buffers to form HAWA buffers 858/module 868. However, the two may be separated. In addition, the controller 823 of FIG. 8 includes an SRAM 839 to which various types of buffer memory may be allocated, including TRAM 845.

In some embodiments, the CPU may allocate and use the HAWA buffers. The non-volatile memory (NVM) 810 can communicate using high speed bus 841 with the HMB 816. The controller 823 and the local cache and buffers including HAWA buffers 858, SRAM 839 and TRAM 845 can also interact at high speed with the HMBs buffers-816 on the host device 804 via the high speed bus 841. In various embodiments, a portion of the HMBs 816 that may be dedicated for use by the storage device 802 is the XTRAM 827 and the FIFO queue 857. In this aspect, the controller allocates buffers in the HMBs 816, which may include the XTRAM 827 and FIFO queue 857, for storing relocation data to enable a larger portion of the local SRAM 839 and HAWA buffers to be used for incoming host writes.

Figure 9:
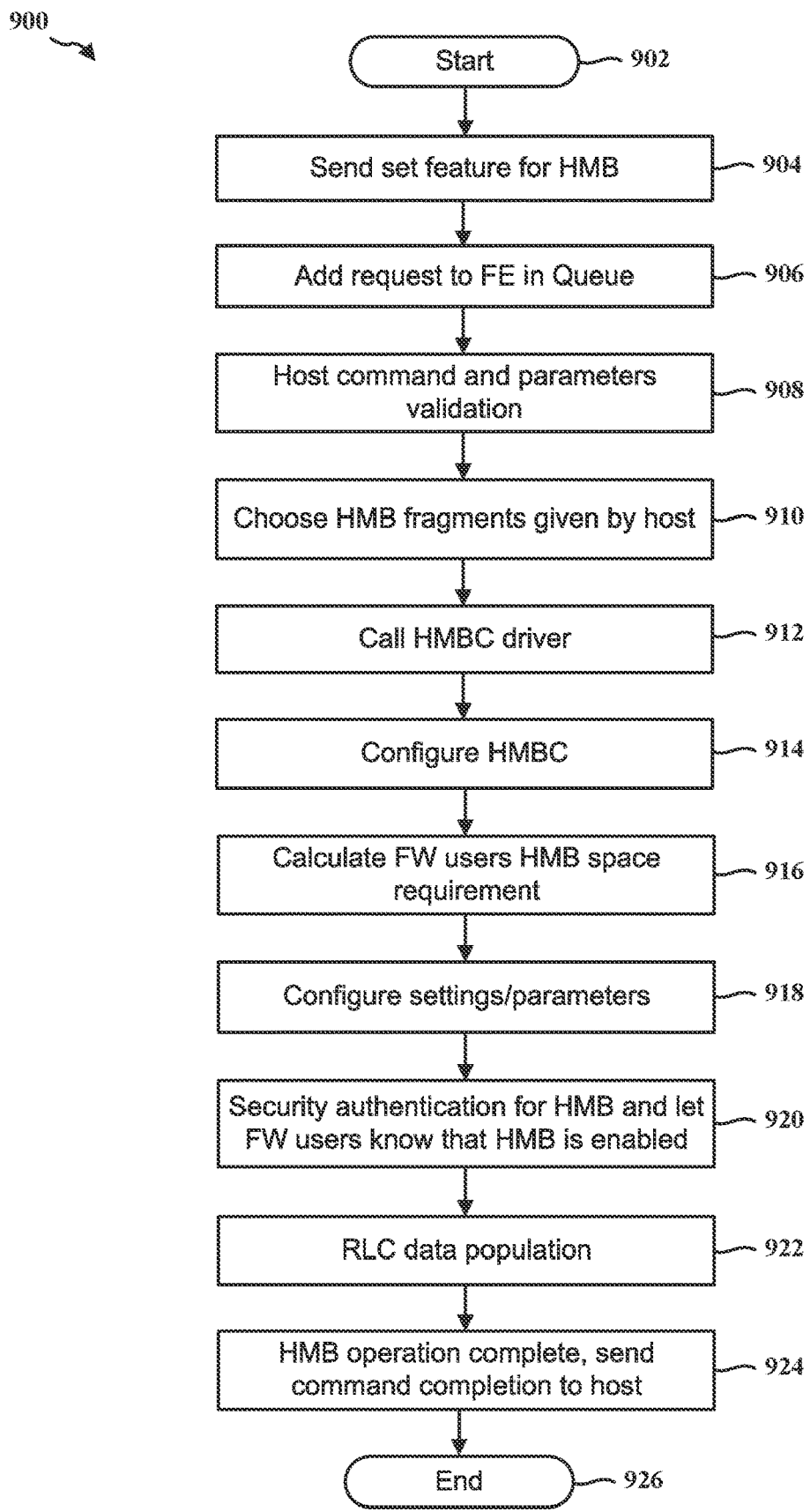
FIG. 9 is a flow diagram of an example of an embodiment of initial host memory buffer allocation and folding for relocation data.

FIG. 9 is a flow diagram of an example of an embodiment of initial host memory buffer allocation and folding. Starting at 902, the host device may in the course of operation send a set of features describing the HMB parameters (902). Thereupon, the in an Host Interface Module (HIM) interrupt service routine (ISR), a request to the front end (FE) is added to the queue (906). In a front end Intellectual Property (FE IP), the host command and parameters are validated (908). The HMB hardware abstraction layer (HAL) may then choose the HMB fragments provided by the host.

With continued reference to FIG. 9, the HMB HAL makes a call to the HMB controller (HBMC) driver program (912). Upon receiving the call, the HBMC driver configures the HMBC for use (914). Control may then return to the HMB HAL, in which firmware (FW) users' (FW users are like the Cached Address Table (CAT), XORs (a module which exclusive-ORs the host data and dumps it at the end of zone in the host block), or Relocation (HMB), for example). HMB space requirements are calculated based on the information from the storage device (916). The HBMC driver next uses the calculated information to configure the HMB settings and parameters based on the needs as expressed by the storage device and taking into account limitations of the host (918). The HMB HAL performs security authentication for the HMBs 816 and notifies the FW users at the storage device that the HMB is enabled (920). At that point, operation is ready and the controller at the storage device can populate the HMBs with RLC data (922). At some point after an SSW, for example, the HMB operation may be completed, in which case the controller at the FE IP may provide an indication of command completion to the host device 804 (924). Control flow may end at 926.

The above call flows and procedures are exemplary in nature and the controller at the storage device may use other methods of allocating HMB buffer space at the host device 804.

Figure 10:
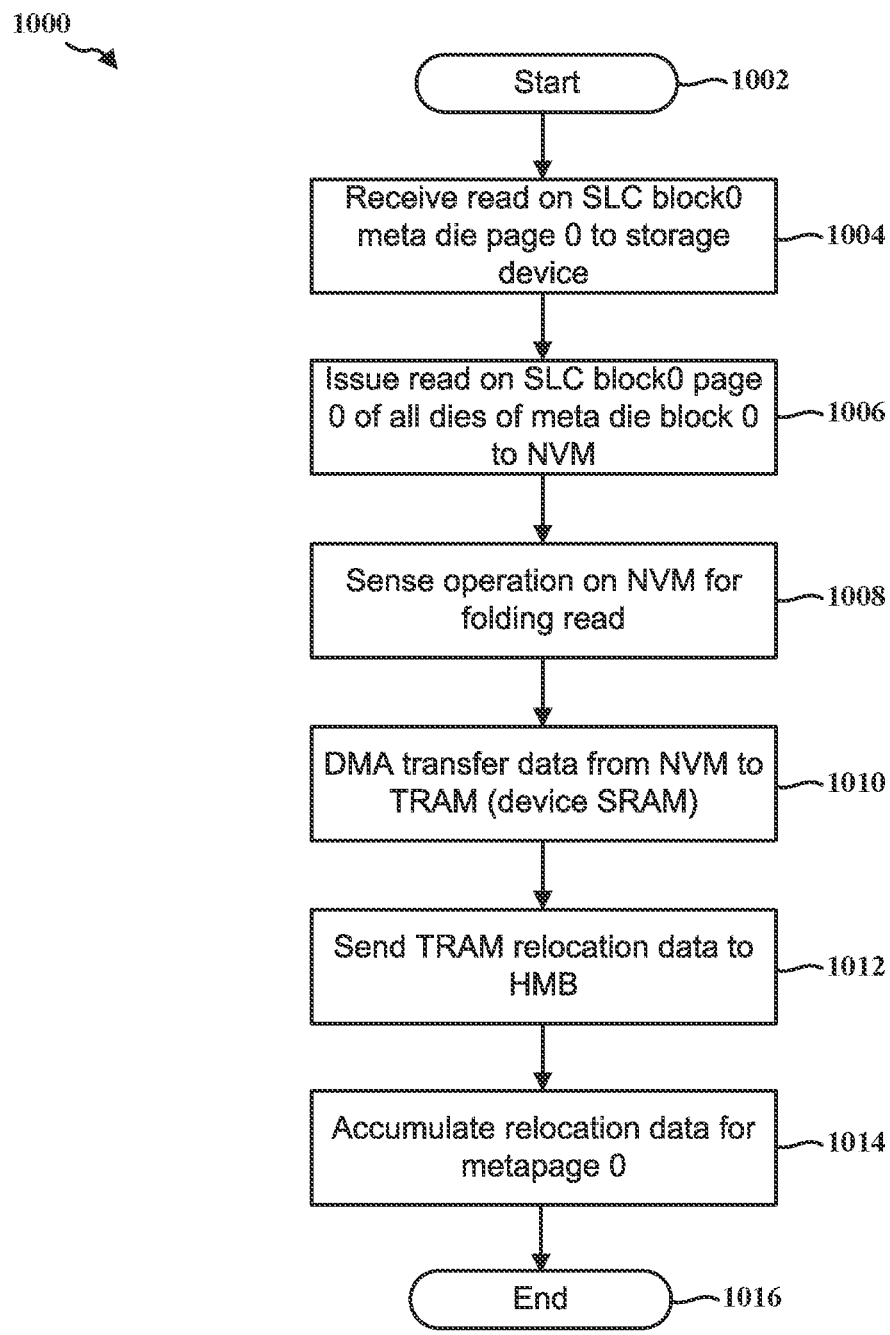
FIG. 10 is a flow diagram of an example of a portion of the folding operation according to an embodiment.

FIG. 10 is a flow diagram of an example of a step of the folding operation according to an embodiment. For clarity, it is assumed for this example that the folding process has been initiated. The control flow starts at 1002. The controller 823 may receive from the host device 804 an instruction to read, for purposes of folding, an SLC block 0 meta die page 0 of an MLC storage device (1004). The controller 823 thereupon may execute a read operation on SLC block 0, page 0 of all dies of meta die block 0 to the NVM 810 (1006). Upon receiving the instruction, the NVM 810 (e.g., NAND memory) may perform a sense operation on the physical memory locations associated with the data to be read (1008). When the first relocation data becomes available, the device can execute a direct DMA transfer of the retrieved data from the NVM 810 to the local TRAM 845 in the device SRAM 839 (1010). The relocation data can then be transferred from the TRAM via high speed bus 841 to an allocated location in the HMB 816 (1012). The HMBs 816 can accumulate the relocation data for meta die page 0. In the case of a TLC, three such meta pages can be accumulated into a meta die that can be folded into a TLC cell in NVM 819. It should be understood that the foregoing flow diagram is merely an example. In other configurations, the controller 823 and its components may mediate the entire process.

Figure 11:
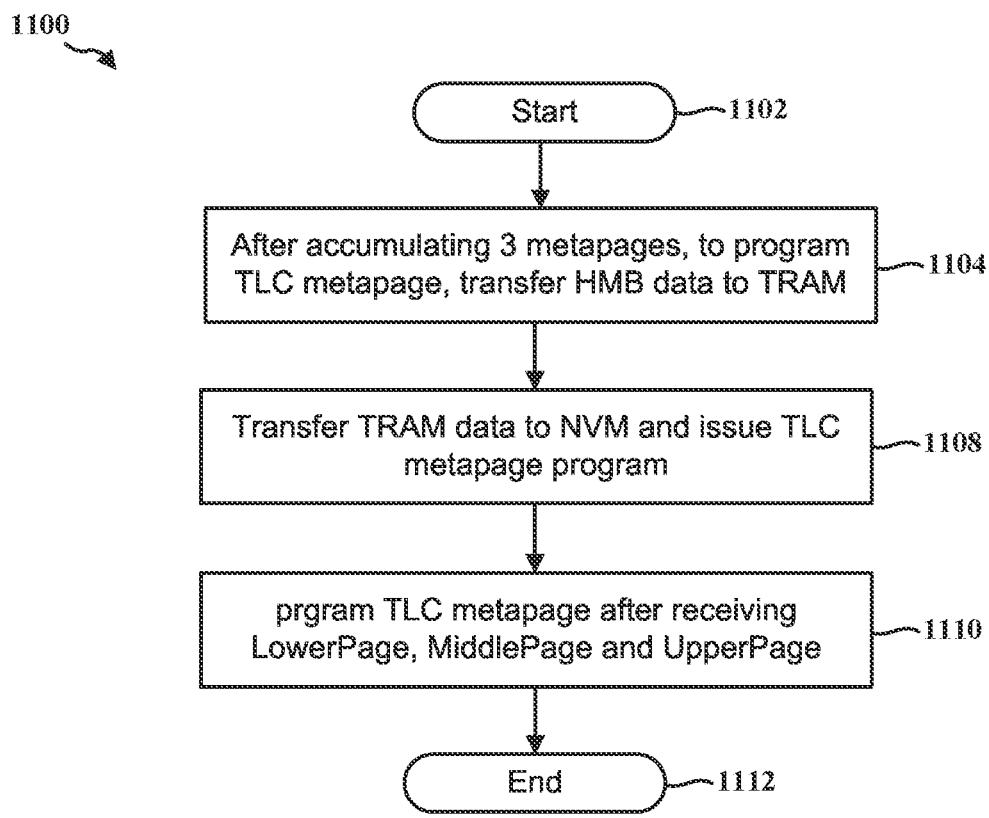
FIG. 11 is a flow diagram of an example of a repeated fold process for an SLC memory location in a storage device.

FIG. 11 is a flow diagram of an example of a repeated fold process for an SLC memory location in a storage device. When control starts at 1102, it is assumed that three meta pages have been retrieved from the NVM 810 and transferred to the HMB as relocation data (1104). The data may be transferred via high speed bus 841 to local SRAM 839 or TRAM 845. As noted, SRAM may include different types of device volatile memory (TRAM, XRAM, MRAM/ARAM, BRAM, or the like), which may also be used for this purpose. The transfer may be executed by the host 804 or the storage controller 823, depending on the implementation. The controller 823 thereupon transfers the data in the TRAM to the NVM and may issue a TLC meta page program for writing the three meta pages into a TLC memory location (1108). In various embodiments, the controller 823 programs the TLC meta die page after receiving from TRAM the LowerPage, MiddlePage, and UpperPage (1110). The fold concludes at 1112.

In the above flowcharts, only a single fold operation has been described. In various embodiments, multiple data operations may be performed in parallel. For example, the HAWA buffers 858 may be assisting the CPU 808 in receiving SSWs and handling incoming host data transferred by the host 804 or obtained by the HAWA module from host DRAM. In various embodiments, the NVM may be NOR memory, or any type of MLC memory. In other embodiments the storage device may be integrated with the host. In some embodiments, the TRAM can be bypassed and the data cached directly on the NVM 810. Also, many embodiments use numerous NVMs on one or more FIMs, each of which may encounter SSWs and may initiate the process of allocating buffers.

The optimal selection of how much TRAM should be allocated as HAWA buffers, for example, versus how much SRAM or TRAM should be used locally as relocation. In some embodiments, the TRAM is only allocated relocation data that is received back from the HMB 816. This selection will also vary depending on the type and nature of the memory. Below are some examples of data gathered by the inventors when allocating the HMB buffers as RLC buffers.

Figure 12:
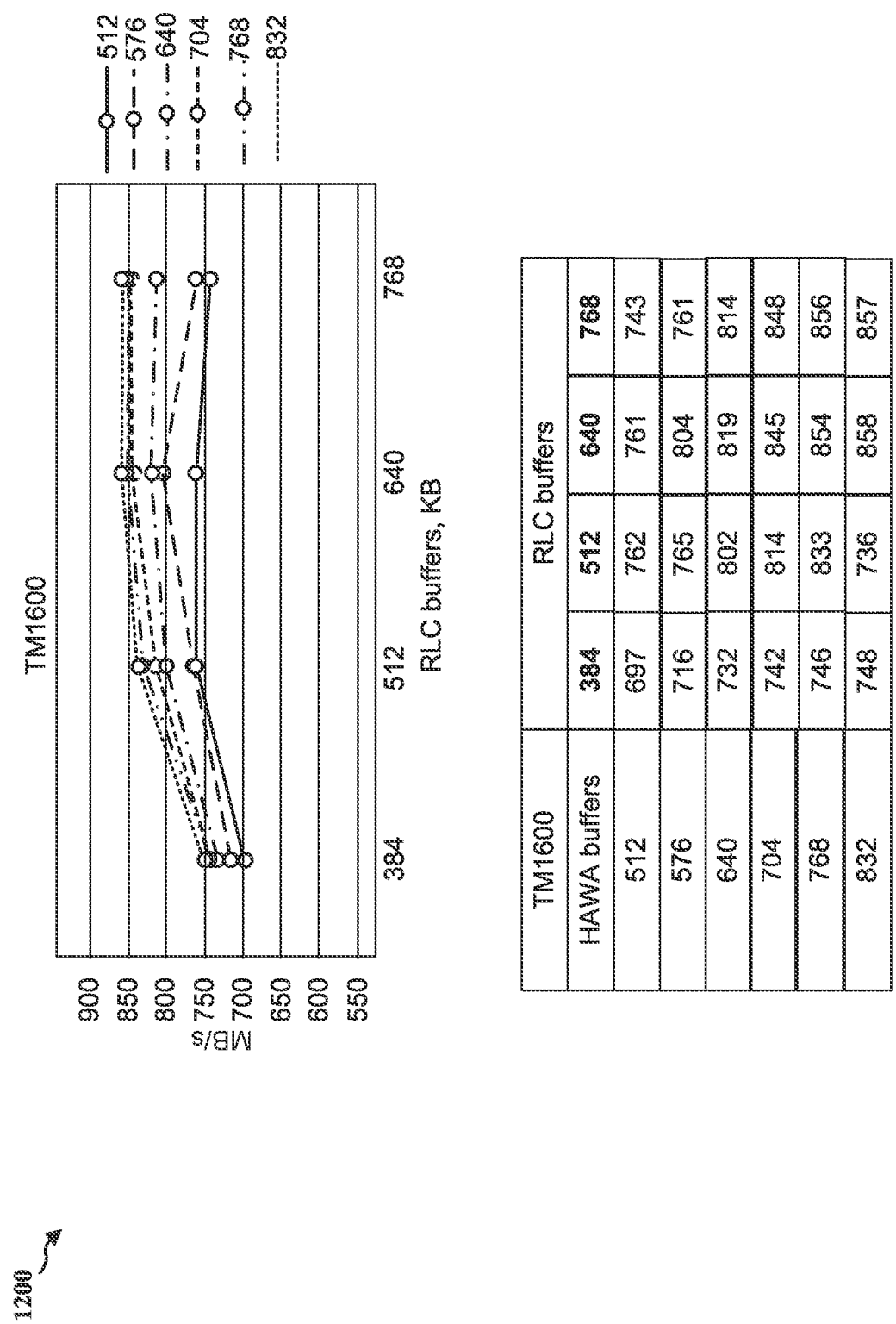
FIGS. 12-14 are exemplary graphical and tabular representations of performance of a solid-state storage device using different buffer configurations.
Figure 13:
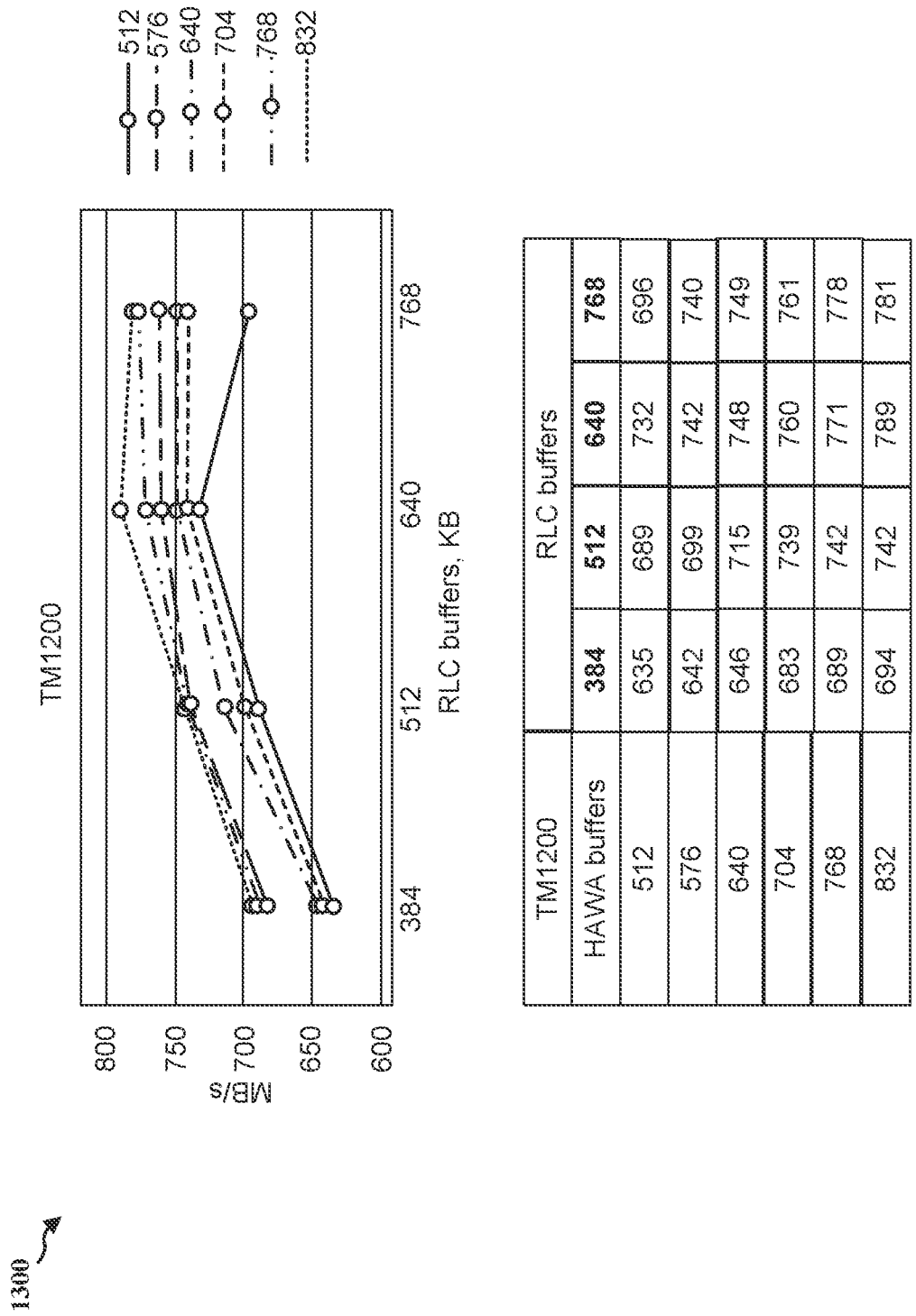
Figure 14:
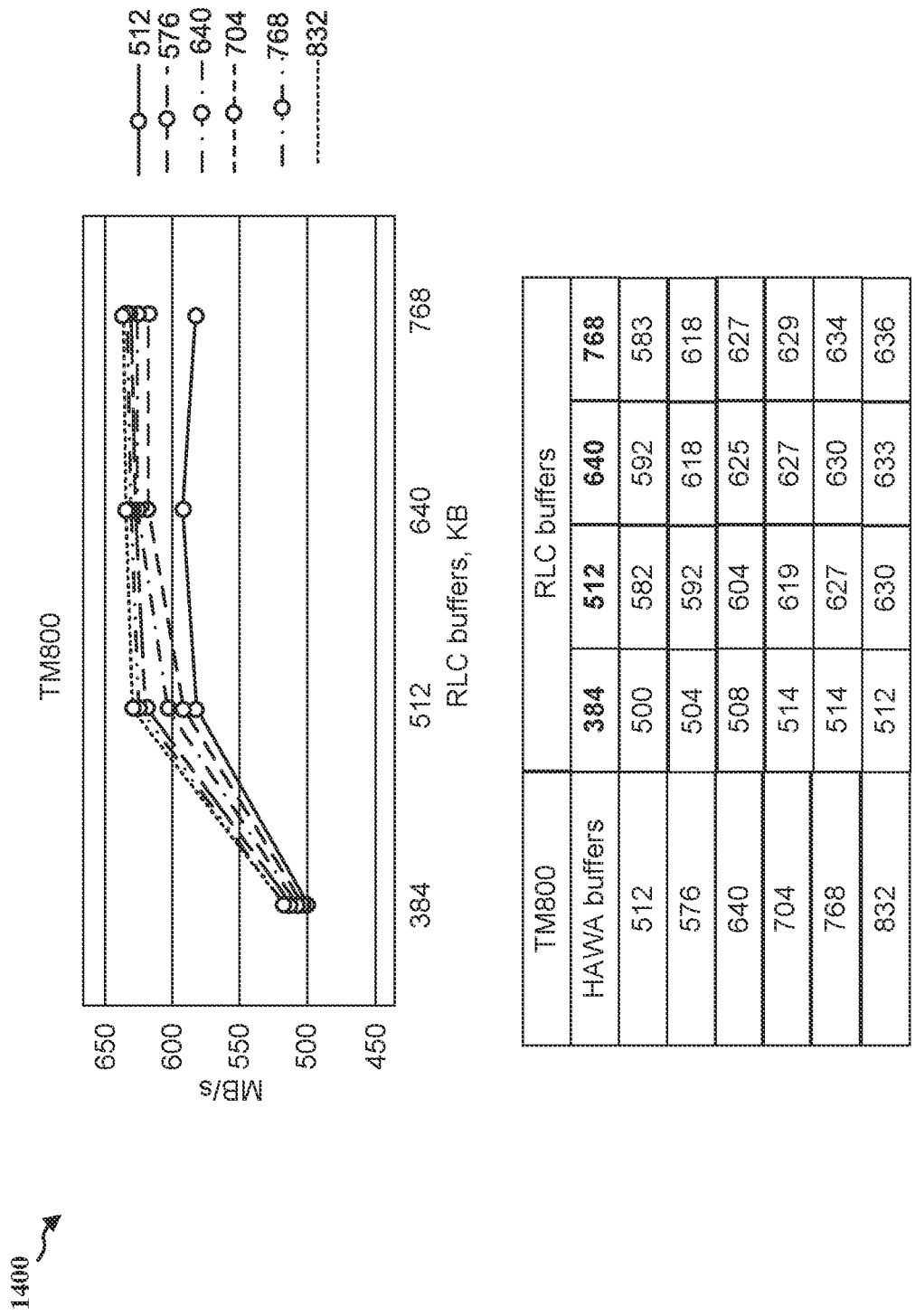

FIGS. 12-14 are exemplary graphical representations 1200-1400 of performance of a storage device using different buffer configurations. Each figure shows the SSW performance using different RLC and HAWA buffer sizes for different toggle modes. While the examples shown are all 2 TB TLC SSDs for comparison and clarity person, it will be appreciated that NVM of any kind can be employed in a similar manner.

FIG. 12 shows data for the 2 TB TLC SSD having a toggle mode of 1600 as shown in the table. After identifying the relevant toggle mode, the leftmost column of the table identifies the number of allocated HAWA buffers in KB, in this case from 512 KB to 832 KB. The first highlighted row of the table shows the allocation capacity of the RLC buffers, also in KB. An appreciable and increasing portion of RLC buffers are allocated in the HMBs in order to keep the allocation of HAWA buffers high. The middle portion of the table illustrate numerically the sustained sequential write speed of the storage device measured in Megabytes/second (MB/s). The table above shows a graphical representation of the numerical values in the table, with a different styled line corresponding to each of the six measurements taken with a single HAWA buffer capacity. The circles in the lines show the different allocations of the RLC buffers when the measurements were taken. The legend to the right of the table shows the different HAWA buffer capacities for the respective measurements. The left vertical axis indicates SSW speed in MB/s, consistent with the measurements in the table. From the allocations and SSW speeds an optimal set of values can be extracted.

With reference now to FIG. 13, the same measurement criteria and graphical/tabular representations are employed. As an example, it can be seen that an optimal allocation of RLC buffers may be in the neighborhood of 640 KB to 768 KB, in which case most or all can be allocated to the HMB buffers. Hence, absent use of the HMBs, the observed performance likely could not be achieved, at least without other negative ramifications. The toggle mode for the device in FIG. 13 is 1200.

FIG. 14 shows the same tabular format and graphical representation as shown in FIGS. 12 and 13, and refers to the 2 TB TLC SSD with toggle mode 800. Here, it can be seen that for most HAWA allocations, an optimal speed can be achieved using RLC buffers starting at about 512 KB, whereas performance degrades significantly below the 512 KB value. While the graphical representation of all three FIGS. 12-14 show occasional anomalies, more often than not they reveal a trend from which optimal values can be easily ascertained and implemented with the assistance of the HMBs for folding and compaction. Stated differently, with the optimal number of RLC and HAWA buffer combinations, maximum SSW performance can be obtained.

It is also noteworthy that the different buffers are allocated similar amounts to take into account bus widths or maximum widths of the memory. However, this trait may vary substantially along the lines of different memory architectures and different features within the same architecture. Attaining these buffer sizes is not possible in light of the limited TRAM buffers without adversely impacting other significant benchmarks.

It should be underscored that HMBs can interact at much higher speeds with the RAM-based buffers when compared to the actual NAND, whose programming can be substantially longer. In addition, for Gen4 technologies, the speeds range from 16 GT/s for a single lane and 64 GT/s for four lanes, so the data transfers for the HMB buffers will be very fast. Thus, in various embodiments, only a small amount of RLC buffers can be reserved from local TRAM on the storage device. These RLC buffers can be used for data transit only (e.g., from the HMB to the NVM via the TRAM), and the extra RLC buffers can be taken from the HMB. This implementation can avoid the delays otherwise caused by the limited pool of SRAM RLC buffers that is currently available for folding and compacting data. Further, this implementation can leave extra margin (e.g., SRAM size) for allocation to the HAWA buffers. In the case of QLC memory configurations, this implementation can also avoid the time-consuming re-reading of the same data during the QLC Foggy-Fine programming.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other magnetic storage devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) in the United States, or an analogous statute or rule of law in another jurisdiction, unless the element is expressly recited using the phrase "means for" or, in the case of a method claim, the element is recited using the phrase "step for."

What is claimed is:

1. A data storage apparatus, comprising:
a non-volatile memory including a memory location; and
a controller coupled to the non-volatile memory and configured to:
allocate one or more host memory buffers (HMBs) in a host device for storing relocation data;
store the relocation data in the allocated one or more HMBs, wherein an amount of the relocation data stored in the one or more HMBs is an integer multiple of a width of a page or a meta-page including single-level cell (SLC) data in the non-volatile memory, and a capacity of a relocation (RLC) buffer allocated in the one or more HMBs for storage of the relocation data is based on the width of the page or the meta-page in the non-volatile memory; and
write the relocation data from the RLC buffer in the allocated one or more HMBs to the memory location.

2. The apparatus of claim 1, wherein the relocation data is written during one or both of folding or compaction.

3. The apparatus of claim 1, wherein the controller is configured to receive an input/output (I/O) instruction from the host device, the I/O instruction being a write instruction, and the controller includes a hardware acceleration (HAWA) buffer configured to store host data associated with the write instruction in parallel with the storage or write of the relocation data.

4. The apparatus of claim 1, wherein the controller is configured:
to enter a sustained write mode upon receiving consecutive sequential input/output (I/O) commands; and
to fold SLC data into multi-level cell (MLC) data using the relocation data stored in the one or more HMBs while in the sustained write mode.

5. The apparatus of claim 1, further comprising static random-access-memory (SRAM) included in the controller, the SRAM including an additional RLC buffer for writing of the relocation data from the one or more HMBs to the memory location.

6. The apparatus of claim 1, wherein a sustained sequential write speed of the data storage apparatus is based on the capacity of the RLC buffer in the one or more HMBs and a hardware acceleration (HAWA) buffer capacity in the controller.

7. The apparatus of claim 1, wherein the memory location is a multi-level cell (MLC) storage location.

8. A data storage device, comprising:
non-volatile memory including a plurality of storage locations; and
a controller coupled to the non-volatile memory and configured to:
receive successive write instructions from a host device;
allocate host memory buffers (HMBs) in the host device for relocation data;
retrieve the relocation data from the non-volatile memory to be stored in the HMBs, wherein an amount of the relocation data to be stored in the HMBs is an integer multiple of a width of a page or a meta-page including single-level cell (SLC) data in the non-volatile memory, and a capacity of relocation (RLC) buffers allocated in the HMBs for storage of the relocation data is based on the width of the page or the meta-page in the non-volatile memory; and write the relocation data from the RLC buffers in the HMBs while processing one or more of the successive write instructions.

9. The device of claim 8, wherein the relocation data is written during folding or compaction.

10. The device of claim 8, wherein the plurality of storage locations includes a plurality of multi-level cell (MLC) storage locations and a corresponding plurality of sets of single-level cell (SLC) storage locations, and each of the corresponding plurality of sets of SLC storage locations equals a capacity of one of the plurality of MLC storage locations.

11. The device of claim 10, wherein the controller is further configured to store the relocation data in the HMBs, the relocation data being retrieved from one of the corresponding plurality of sets of then SLC storage locations and written during folding to one of the MLC storage locations during processing of the one or more of the successive write instructions.

12. The device of claim 10, wherein the MLC storage locations include one of triple-level-cell (TLC) storage locations or quadruple-level cell (QLC) storage locations.

13. The device of claim 8, wherein the controller is configured to:
fold single-level cell (SLC) data into multi-level cell (MLC) data using the relocation data stored in the HMBs during a sustained write mode.

14. The device of claim 8, wherein the controller is further configured to set a value for a toggle mode for optimized sustained sequential write performance.

15. The device of claim 8, further comprising a hardware acceleration (HAWA) module configured to:
retrieve data associated with the one or more of the successive write instructions from a random access memory (RAM) in the host device;
transfer the retrieved data to a transfer random access memory (TRAM) in the controller for incoming host data accumulation; and
send a notification to the controller identifying the data transfer.

16. The device of claim 15, wherein a sustained sequential write speed of the data storage device is based on the capacity of the RLC buffers including the relocation data and a capacity of buffers associated with the HAWA module.

17. A data storage apparatus, comprising:
a volatile memory;
a non-volatile memory including a plurality of memory locations; and
a controller coupled to the non-volatile memory and the volatile memory and configured to:
receive a plurality of sequential write operations from a host device;
execute one of the plurality of sequential write operations to store data in one of the memory locations; and
allocate, during execution of the one of the sequential write operations, relocation data in a first capacity to the volatile memory and in a second capacity to a host memory buffer (HMB) in the host device, wherein an amount of the relocation data allocated to the HMB is an integer multiple of a width of a page or a meta-page including single-level cell (SLC) data in the non-volatile memory, and a capacity of a relocation (RLC) buffer allocated in the HMB for storage of the relocation data is based on the width of the page or the meta-page in the non-volatile memory.

* * * * *